Figure 1:
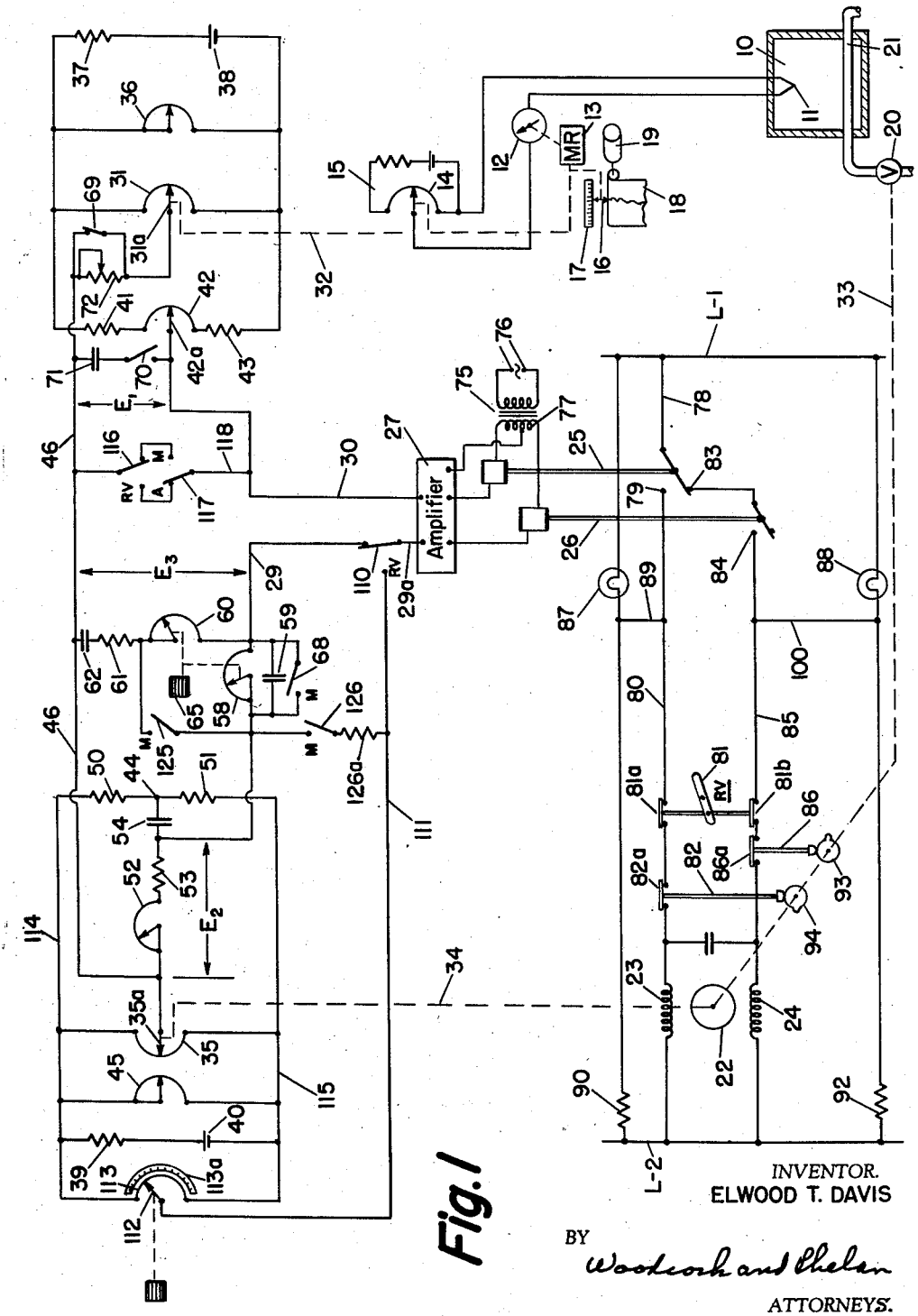

INVENTOR.
ELWOOD T. DAVIS

Jan. 12, 1954   E. T. DAVIS   2,666,170
RATE AND RESET REBALANCEABLE CONTROL SYSTEM
Filed March 15, 1950   5 Sheets-Sheet 3

INVENTOR.
ELWOOD T. DAVIS
BY
Woodcock and Phelan
ATTORNEYS.

INVENTOR.
ELWOOD T. DAVIS
BY Woodcock and Phelan
ATTORNEYS.

Jan. 12, 1954 E. T. DAVIS 2,666,170
RATE AND RESET REBALANCEABLE CONTROL SYSTEM
Filed March 15, 1950 5 Sheets-Sheet 5

INVENTOR.
ELWOOD T. DAVIS
BY
ATTORNEYS.

Patented Jan. 12, 1954

2,666,170

UNITED STATES PATENT OFFICE 2,666,170

RATE AND RESET REBALANCEABLE CONTROL SYSTEM

Elwood T. Davis, Havertown, Pa., assignor to Leeds and Northrup Company, Philadelphia, Pa., a corporation of Pennsylvania Application March 15, 1950, Serial No. 149,775

31 Claims. (Cl. 318—28)

1

This invention relates to the automatic control of variable physical characteristics such, for example, as temperature or pressure or other conditions, and more particularly to an electrical system which provides proportioning control plus reset action and adjustable rate action in the operation of the condition-controlling or compensating means.

The invention relates particularly to electrical systems of the type disclosed in Callender et al. Patent No. 2,175,985. In that patent there are disclosed systems which provide proportioning control action, reset action, and rate action, but such systems leave much to be desired in stabilized action of the electrical network including the circuit-adjusting element operable with the compensating means which adjusts the value of the characteristic under control.

In carrying out the invention in one form thereof, a responsive means operable in response to the deviations of the characteristic from a desired value is utilized to adjust a circuit element, such as a slidewire resistor, of an electrical network to produce in the network a voltage whose magnitude is under the control of said responsive means. The network is provided with a second circuit element, such as a slidewire resistor, for producing in the network a second voltage whose magnitude is varied in accordance with a compensating means which may be a valve, or a rheostat operable by suitable driving means such, for example, as a motor. The arrangement is such that upon the production of the first voltage by the responsive means, the compensating means is adjusted to vary the second voltage until it is equal and opposed to the first voltage to rebalance the network. In this manner there is provided the proportional control action. More particularly, the unbalance between the two voltages in the network is applied to the input circuit of an amplifier whose output controls the operation of the motor. By means of a resistor and a capacitor associated with the input circuit to the amplifier, there is provided control of operation of the compensating means in accordance with the summation of the deviation from a desired value, this adjustment ordinarily being known as reset or droop-corrector action.

In accordance with the present invention, the network is provided with an attenuating resistor in the amplifier input circuit and a capacitor in series with a resistor in a branch of the network which is not directly in series with the input circuit to the amplifier for producing a controlled rate adjustment, a major component of which varies with rate of change of the variable characteristic. The resistor in the branch circuit and the attenuating resistor in the input circuit are

2 mechanically joined together for simultaneous adjustment. Upon adjustment in one direction, the resistance of the resistors in their respective circuits is increased and upon adjustment in the opposite direction the resistance introduced into their respective circuits is decreased. While the magnitude of the rate adjustment is under the control of the attenuating resistor in the input circuit to the amplifier, the resistor in the branch circuit is simultaneously adjusted in order that there shall be maintained stabilized operation of the motor driving the compensating means. The resistor in the branch circuit always maintains therein a resistance bearing a predetermined relation with that in series with the input circuit of the amplifier. Preferably a fixed resistance is also maintained in the branch circuit for stabilization for cases when both of the other resistors are adjusted to minimum or zero values.

In accordance with further aspects of the invention, there are provided additional features taking advantage of the circuit arrangement as a whole and including an arrangement by means of which the position of the compensating means may be determined at any time without disturbing the adjustment of the network or the control action due to the component parts of the network. Additionally, further control features are provided of a type particularly useful in starting up the system as a whole. These additional features will be later pointed out with greater particularity.

Figure 2:
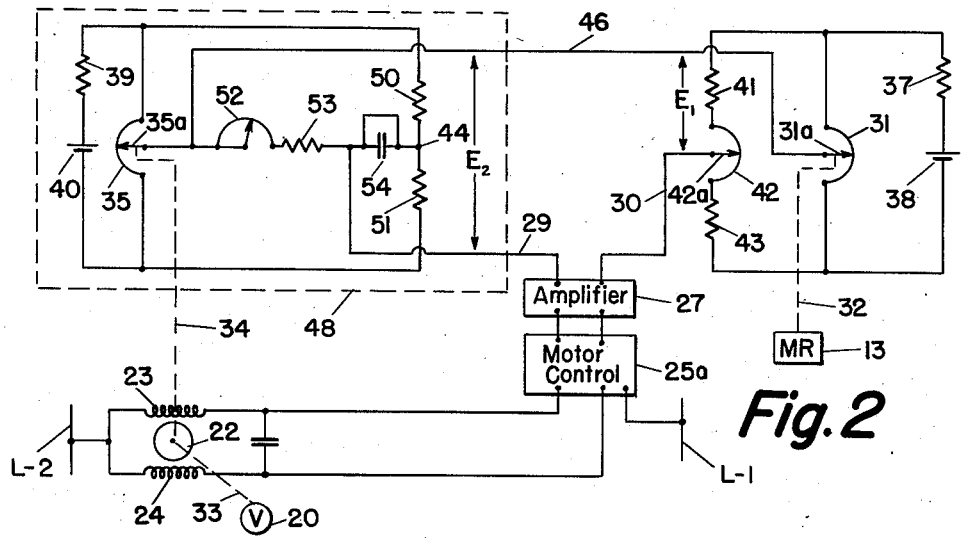
Figure 3:
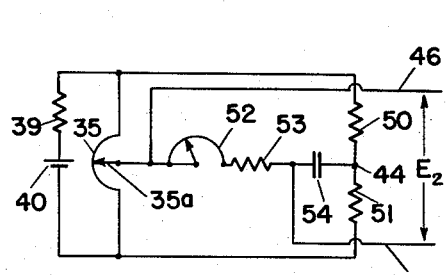
Figure 4:
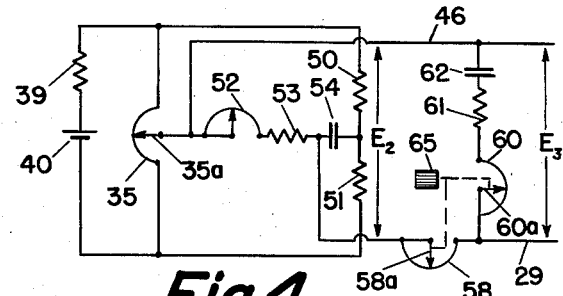
Figure 5:
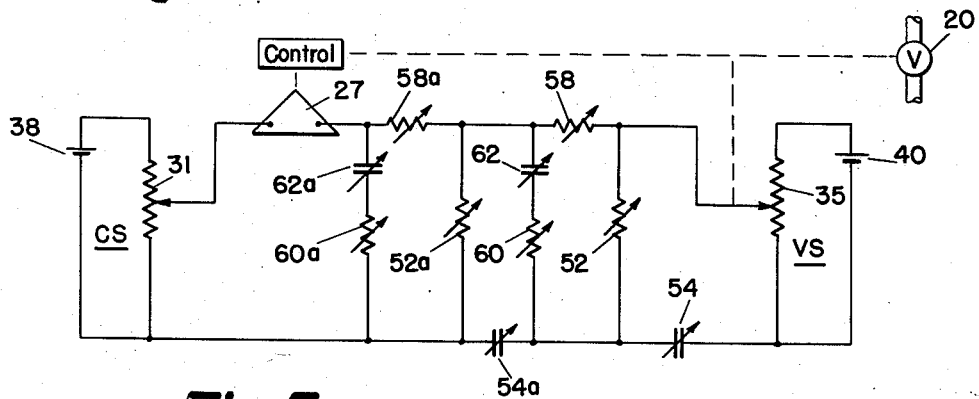
Figure 6:
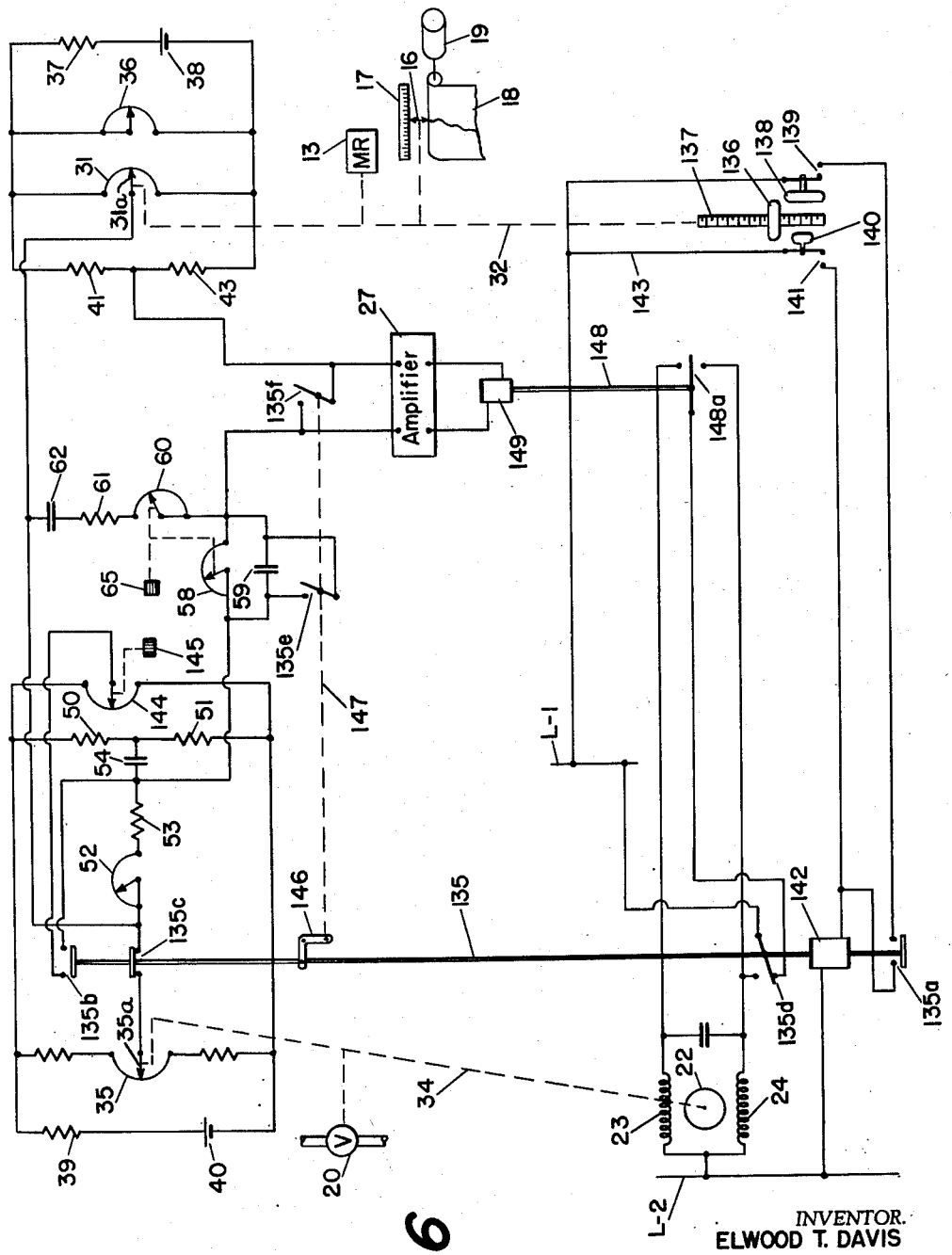
Figure 7:
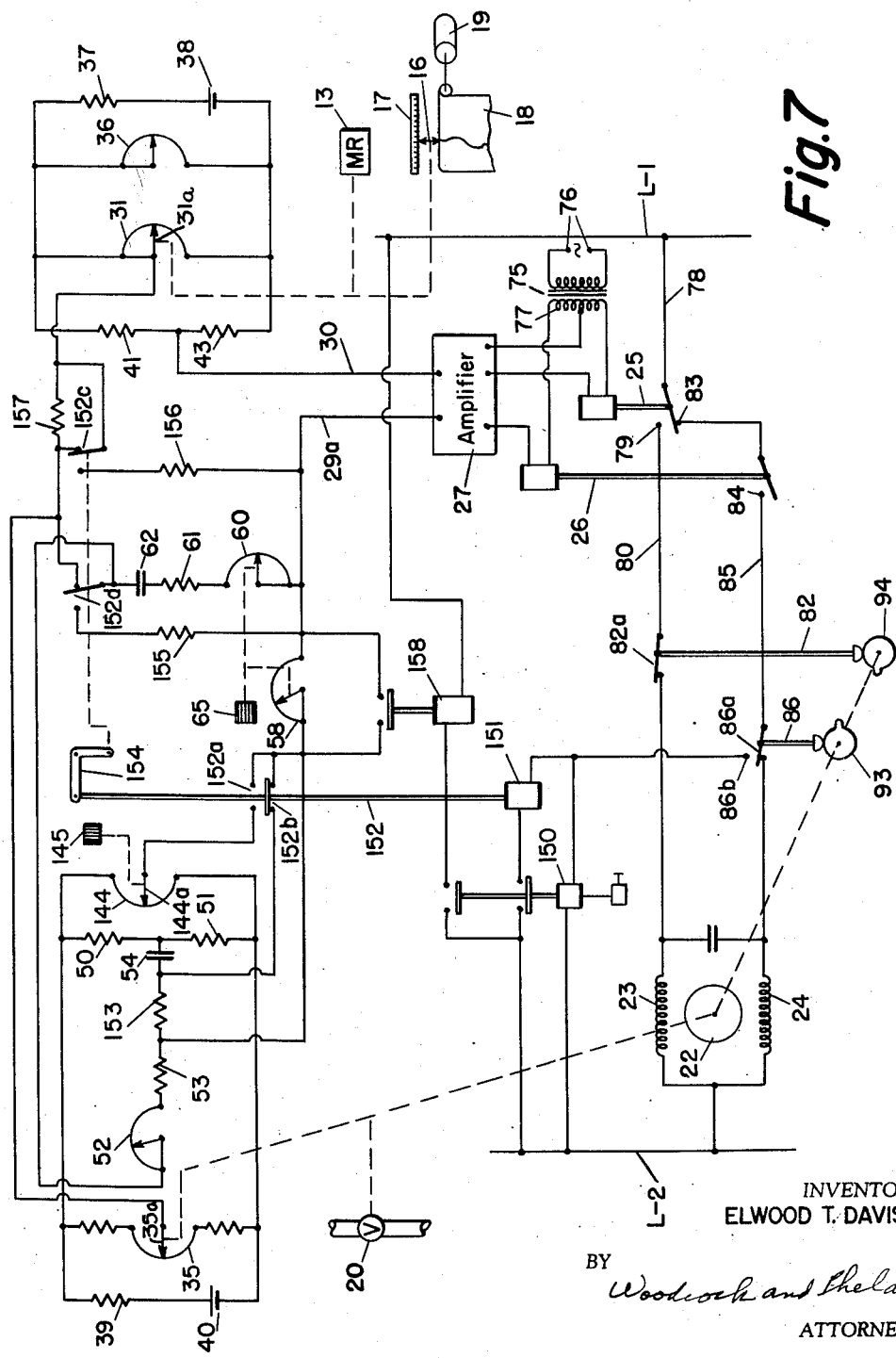
Figure 8:
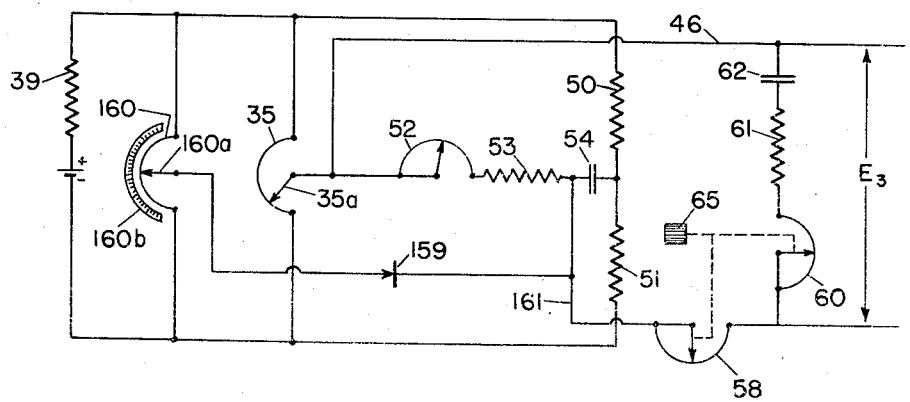

For further objects and advantages of the invention and for a discussion of said additional features, reference is to be had to the following description taken in conjunction with the accompanying drawings in which:

Fig. 1 diagrammatically illustrates one modification of the invention;

Figs. 2–4 are fragmentary wiring diagrams to be referred to in explanation of their combined functions in Fig. 1;

Figs. 5 and 8 are fragmentary wiring diagrams of further features of the invention applicable to Figs. 1 and 7; and Figs. 6 and 7 diagrammatically illustrate further modifications of the invention.

Referring now to Fig. 1, the invention has been illustrated as applied to the control of a variable characteristic which may be the temperature of a furnace or heat-treating device illustrated symbolically by the compartment or chamber 10. By means of a thermocouple 11, subject to the temperature within chamber 10, a voltage applied to a measuring circuit including a galvanometer 12 controls operation of a circuit-adjusting means such as a mechanical relay 13 which serves to adjust a slidewire resistor 14 in a potentiometer circuit 15 to oppose the voltage of the thermocouple. The mechanical relay 13 also serves to adjust an index and pen 16 relative to a scale 17 and a chart 18 driven by a constant speed motor 19. The heating or cooling of the compartment 10 is controlled by means of a valve 20 for circulating a heating or cooling medium through a heat-transferring coil 21.

The valve 20, which is to be taken as representative of any suitable compensating means, is operated under the control of a reversible motor 22 having forward and reverse windings 23 and 24. The motor windings 23 and 24 are selectively energized under the control of forward and reverse relays 25 and 26 energized under the control of an amplifier 27, preferably of the high-impedance high-gain type. The input circuit formed by conductors 29 and 30 of the amplifier is connected to an electrical network having a control slidewire resistor 31 mechanically driven as indicated by the broken line 32 by the mechanical relay 13. In practice either the disc upon which is coiled the resistor 31, or the associated contact, may be driven from the drive shaft of the mechanical relay 13. For simplicity and uniformity in the wiring diagram, each contact associated with a slidewire resistor of the network has been illustrated as adjustable. The control slidewire 31 forms a branch of the network and is connected through a resistor 37 to a source of supply shown as a battery 38. A variable resistor 36 controls the magnitude of the voltage applied to slidewire 31 by battery 38.

The motor 22 is not only mechanically connected for adjustment of the valve 20, as indicated by the broken line connection 33, but also drives the contact 35a of slidewire 35 as indicated by the broken line connection 34. The slidewire 35 is connected through a resistor 39 to a source of supply indicated as a battery 40. A variable resistor 45 controls the magnitude of the voltage applied to slidewire 35 by battery 40.

As shown, the control slidewire 31 is connected in parallel with a branch of the circuit including a resistor 41, a slidewire 42 and a resistor 43. One or both of the resistors 41 and 43 may be omitted, if desired. One side of the input circuit to the amplifier 27 extends by way of conductor 30 to the contact 42a of slidewire 42. Thus, it will be seen that upon adjustment of the contact 31a of control slidewire 31, the voltage $E_1$ developed between contact 42a of slidewire 42 and a conductor 46 leading to the contact 31a of slidewire 31 will vary.

The conductor 46 extends to and is connected to the contact 35a of slidewire 35. The slidewire 35 is connected across a branch of the circuit including resistors 50 and 51. In the circuit extending from contact 35a to the juncture of resistors 50 and 51 are a slidewire resistor 52, a fixed resistor 53 and a capacitor 54, these elements being in a common loop-circuit with slidewire 35.

Fig. 2 illustrates the network thus far described except that the capacitor 54 is shown as conductively by-passed and resistors 36 and 45 have been omitted. It will be immediately seen that the system so far described and as shown in Fig. 2 will provide proportional control action. That is to say, for a given adjustment of the contact 31a of the control slidewire 31 by the mechanical relay 13 there will be a corresponding follow-up adjustment by the motor 22 of the valve 20 and of the slidewire 35. If the voltages respectively applied to slidewires 31 and 35 are equal, a given angular movement of contact 31a will produce an equal angular adjustment of contact 35a. Mathematically, for a given change in the variable characteristic, $\theta$, the adjustment of slidewire contact 35a and valve 20 will be equal to $K_1\theta$, where $K_1$ is a constant. The proportionality may be changed by adjustment of either resistor 36 or 45, Fig. 1. If resistor 36 is set to make the voltage across slidewire 31 greater than that across slidewire 35 in the circuit of Fig. 1, a greater relative movement of slidewire 35 will be required to produce an increase in voltage $E_2$ equal to the changed value of voltage $E_1$. The foregoing adjustments are referred to as throttling range adjustments. In practice resistors 36 and 45 may be mechanically connected for simultaneous adjustment but in opposite directions to produce maximum change in throttling range and a single scale which may be calibrated in terms of per cent of scale 17.

Again referring to Fig. 2, upon movement of contact 31a a signal or error voltage $E_1$ appears between conductors 30 and 46 which will be greater or less than the voltage $E_2$ across conductors 29 and 46. The difference voltage is applied to the high-gain amplifier 27 and its output may be applied either directly or through a suitable motor control or relay means 25a to produce energization of motor 22 to adjust contact 35a of slidewire 35 in a direction and to an extent to make the voltage $E_2$, across resistors 52 and 53, equal and opposite to the voltage $E_1$. With the voltage $E_1$ changing and because of the high amplifier gain and the action of motor 22, the contact 35a will be driven and will continue to be moved by motor 22 to maintain voltage $E_2$ approximately equal and opposite to voltage $E_1$. Whenever equality is established the motor 22 is, of course, deenergized. It is to be further observed that the voltage $E_2$ may be considered as that produced by the potential difference due to the current flowing through resistors 52 and 53. Such a proportional action control system is not adequate for control of most processes where load demand varies and where the magnitude of the condition or the variable characteristic is to be maintained at a predetermined value notwithstanding such changes in load.

The capacitor 54 and the resistance in the circuit provided by slidewire 52 and resistor 53 introduce a correction for droop resulting from proportional action only. That correction is referred to by those skilled in the art as reset, or droop corrector action, meaning a correction which prevents permanent decrease or offset from the control point of the variable characteristic with rising load. Mathematically, the reset action may be expressed as a correction of magnitude corresponding with the summation with respect to time of the deviation of the characteristic from a predetermined value, i. e., equal to $K_2 \int \theta dt$, where $K_2$ is a constant and $dt$ is the time differential increment. Fig. 3 illustrates the circuit of Fig. 2 within rectangle 48 with capacitor 54 between resistor 53 and the juncture of resistors 50 and 51.

With the capacitor 54 in the circuit, the slidewire 35 will be moved by motor 22 to maintain the equality between the voltage $E_2$ across resistors 52 and 53 and the voltage $E_1$ between conductors 30 and 46, Fig. 2. In order that the potential difference across resistors 52 and 53, i. e., $E_2$, shall be maintained at a constant value and equal and opposite to $E_1$, it is required that there be a constant current flowing through them. Inasmuch as the input circuit of amplifier 27 is of high impedance, all of the current through them may be assumed to flow through capacitor 54. Accordingly, the capacitor 54 gradually accumulates a charge and the potential across it rises. A rise in voltage across capacitor 54 requires an increase in the potential between contact 35a and the juncture point 44 in order to maintain the required value of current flow through resistors 52 and 53 to balance the voltage $E_1$. In consequence, the motor 22 will be progressively energized to move the contact 35a of slidewire 35 to meet the foregoing conditions. The motor 22 will continue to be energized so long as there is departure in the value of the characteristic from its desired value, generally referred to as the control point. Accordingly, the adjustment of the valve 20 and of the slidewire 35 will be in accordance with the sum of, first, the deviation of the characteristic and, secondly, of the summation of the deviation of the variable characteristic with respect to time from its predetermined value. It is again emphasized that whenever the motor moves the contact 35a relative to the slidewire 35 to the position required for balance, the motor will be deenergized. The control action is generally by a series of steps or intermittent operations of the motor.

In order to provide rate action, that is, an adjustment of the valve 20 by the motor 22 in accordance with rate of change of the variable characteristic, there are provided the circuit connections shown in Fig. 4 to be substituted in Fig. 2 for the circuit within rectangle 48 and including the slidewire resistor 58 and a capacitor 62. Mathematically, the rate action may be expressed by saying that there will be provided a component equal to $$K_3 \frac{d\theta}{dt}$$

where $K_3$ is a constant. The circuit also includes a slidewire 60 and a resistor 61. The voltage $E_2$ developed across resistors 52 and 53, with reset capacitor 54 bypassed as shown in Fig. 2, is varied by adjustment of slidewire contact 35a of the slidewire 35. Since the voltage developed or applied to the network by the slidewire 35 gives rise to the voltage $E_2$, it will be seen that slidewire 35 is included in a loop-circuit including resistors 58, 60, 61 and capacitor 62 with resistor 58 connected between slidewire 35 and what may be termed an output branch of the loop-circuit comprising capacitor 62 and resistors 60 and 61, the voltage $E_3$ being developed across that branch.

The resistor 61 in the shunt circuit insures that there will always be in circuit with capacitor 62 a predetermined value of resistance even though slidewire resistor 60 is set to zero. The slidewire resistor 58 provides for ready adjustment of the magnitude of the rate action provided by the circuit. It will be seen that the resistor 58, in series in the input circuit to the amplifier, attenuates the signal $E_2$ and that the voltage $E_3$ which is then effective to oppose $E_1$ will be the voltage which appears across that branch of the network including resistors 60 and 61 and capacitor 62. Thus, in order that the voltage $E_3$ between conductor 29 and conductor 46 shall remain equal to the voltage $E_1$, the voltage across resistors 52 and 53 must be made greater and by an amount equal to the attenuation. Accordingly, the relative movement between contact 35a and slidewire 35, as produced by motor 22, will include a component due to the rate of change of the characteristic. Since the voltage $E_3$ is attenuated by the charging current of capacitor 62 flowing through resistor 58, the voltage $E_2$ must be greater by a corresponding amount. The greater the value of the resistor 58, the greater will be the attenuation, and thus the greater must be the voltage $E_2$ to make the voltage $E_3$ equal and opposite to voltage $E_1$. The greater the rate of change of the characteristic, the greater will be the rate of adjustment of the slidewire contact 35a, and the greater must be the rate of change of $E_3$. The rate of change of current to the branch of the network including capacitor 62 must be correspondingly increased. This in turn requires an increase in the rate of change in the voltage $E_2$ which is produced by movement of slidewire contact 35a under control of the motor 22. The rate action introduces a further component which causes contact 35a to be moved an additional amount dependent upon the rate of change of $E_1$.

The rate action, if excessive, may introduce oscillation into the system. That is to say, as the variable characteristic is returned to its predetermined value, the rate action may produce movement of slidewire contact 35a beyond that which is required to return the characteristic to its selected value or to the control point.

It has been further found that if the rate action is increased above a maximum desired value, the motor 22 will not drive the contact 35a relative to slidewire 35 at a speed which will just maintain the voltage $E_3$ equal to $E_1$ but will make that voltage first less and then greater than that of $E_1$. The oscillation resulting from the excessive rate action is undesirable and has been avoided in accordance with the invention by adding resistance, as the slidewire resistor 60 and resistor 61 in series with capacitor 62. Nevertheless, it is desirable that the rate action be relatively high and near the predetermined value below which the oscillations will not occur. Accordingly, if the resistor 58 is adjusted in one direction by a knob 65, there is through a mechanical connection illustrated by the broken line simultaneous adjustment of slidewire 60 in the same direction.

Without resistors 60 and 61 the voltage $E_3$ would depend entirely upon the charge accumulated by the capacitor 62. However, time is required for the capacitor 62 to acquire a charge. By including resistance as provided by resistors 60 and 61 in the branch including capacitor 62, the voltage $E_3$ is then dependent upon the rate of flow of charging current and upon the potential of capacitor 62. In this way the system is stabilized, and the motor 22 drives the slidewire 35 relative to its contact 35a by an amount dependent upon a component varying with rate of change of the variable characteristic and there is attained stabilized adjustment of the valve 20 though including said component proportional to the rate of change of the variable characteristic.

If the knob 65 is rotated in a direction to increase the value of the resistance of slidewire resistor 58, it will, of course, be understood that the rate action will also be increased. However, since the resistance of slidewire resistor 60 will simultaneously be increased and thus will increase the resistance in series with the capacitor 62, the time constant of the circuit including capacitor 62 will be increased. Thus, as the rate action is increased there will also be provided an increased rate delay. Conversely, when the rate action is decreased by decreasing resistor 58 the rate delay action is likewise decreased. Stated differently, the magnitude of the rate action will depend upon the value of rate resistor 58 and the size of capacitor 62, while the time required for that magnitude of rate action to become fully effective will depend upon the product of the capacitance of capacitor 62 and the resistance of rate-delay resistors 60 and 61.

In two typical embodiments of the invention the resistor 53 had values of 100,000 and 150,000 ohms, the slidewire 52 had maximum resistances of 50 megohms and 100 megohms. The capacitor 54 had capacities of 10 microfarads and 25 microfarads. The slidewire resistor 58 had maximum resistances of 10 megohms and 50 megohms. The slidewire 60 had resistance values of 100,000 ohms and .2 megohm, and the resistor 61, a resistance of 15,000 ohms. The capacitor 62 had capacitances of 25 and 24 microfarads. It it to be understood that the foregoing are to be taken as typical values adapted for systems of controlling processes such as temperature and that they may be varied within relatively wide limits for other applications depending upon the requirements of the particular system to be controlled.

The rate action, if excessive, will tend to magnify any small fluctuations in the input signal though they be of short duration or of transient character. Such magnification of small random variations is highly undesirable. However, by the rate delay provided by resistors 60 and 61, the magnification effect of excessive rate action on the random variations is avoided and the small transient variations do not cause large or amplified oscillations of the valve. More particularly, if the rate action is increased by increasing the resistance of slidewire 58, the system does not magnify the random transient variations in input signals by reason of the fact that the rate delay is correspondingly increased by the increase in the value of resistor 60.

If the slidewire resistor 58 is moved to its minimum or zero resistance position, slidewire 60 will be moved to a similar position. However, since the rate-delay resistor 61 remains effective in circuit with the capacitor 62, there is avoided the hunting or oscillatory action of slidewire contact 35*a* and its adjustment is stabilized.

With slidewire resistors 58 and 60 at their zero-resistance settings, the resistor 61 and capacitor 62 are effectively in parallel with resistor 52 and resistor 53 and in series with capacitor 54. Resistor 61 and capacitor 62 then function to give a magnified signal resulting from the rate of adjustment of contact 35*a* relative to slidewire 35, and this magnified signal produces stabilized operation of the servo-motor loop, the rate action previously provided by resistor 58 being small or absent. The time constant of the circuit which produces the foregoing stabilizing action is negligibly small in comparison with the response time of the process under control. The magnified signal is applied only until the capacitors 54 and 62 acquire network balancing potentials. Stated differently, when resistors 58 and 60 are set at zero, there is for a changing potential, a low impedance path through capacitors 54 and 62 and resistor 61. Hence, the voltage appearing across resistors 52 and 53 transiently appears across resistor 61 to produce voltage E₃. As capacitors 54 and 62 are charged, the slidewire contact 35*a* is further adjusted to maintain the voltage balance between E₁ and E₃ with the voltage across resistor 61 decreasing to zero.

The capacitor 59, Fig. 1, connected in shunt with the slidewire resistor 58 is of relatively small size and is provided to eliminate from the system effects of small rapidly changing variations in the variable characteristic, particularly those of a transitory nature. More particularly, when there is a change in position of slidewire contact 35*a*, the resulting voltage appearing between contact 35*a* and point 44 causes a current to flow through the path of lower resistance or impedance including capacitor 62, resistors 60 and 61, capacitor 59, and capacitor 54. Thus, practically all of the voltage resulting from the new position of the slidewire contact 35*a* appears at E₃ and thus balances the voltage E₁. This stabilizing action is very helpful in avoiding motor oscillation. Since the capacitor 59 is of small size, it soon acquires a charge and its effect disappears. Thus, the effect of the capacitor 59 is temporarily to delay the effectiveness of the rate action introduced by the resistor 58.

It is to be understood that the effect of the capacitor 59 in avoidance of effects due to the rapidly changing transient variations in the characteristic is over and above the rate delay action previously described. The rate delay avoids magnified operation of the motor 22 to adjust the valve in response to small changes in the value of the characteristic while the action of the capacitor 59 is to delay the effectiveness of the rate action so that if during the time delay introduced by the capacitor 59 the characteristic changes from one value to another and returns to its original value, the system does not respond, at least not insofar as the rate action is concerned.

Looking at the operation from a still different standpoint, the action of the resistor 58 is to require a larger change in the voltage E₂ when the value of voltage E₁ is increased. However, the provision of the capacitor 59 temporarily removes the effectiveness of the resistor 58 in attenuating the voltage E₂, and thus all the voltage at E₂ immediately appears at E₃. This means that for the short initial period during which E₁ has changed, E₂ need not be as great as it would have to be if the capacitor 59 had not been provided.

In a typical embodiment of the invention corresponding with the values set forth above, the capacitor 59 may have a capacitance of about one-tenth of a microfarad. With the values set forth above, the time constant of the circuit including capacitor 62 and resistors 61 and 60 is not the same as the time constant of the circuit including capacitor 59 and resistor 58.

There have already been mentioned the terms setting forth the proportional control action, reset action, and rate action. Those terms are from the following equation:

$$-V = K_1\theta + K_2\int\theta dt + K_3\frac{d\theta}{dt}$$

where
$\theta$ is the deviation of the variable characteristic from the control point,
$-V$ is the adjustment of the valve or compensating effect in direction to return $\theta$ to the control point,
$t$ is time, and
$K_1$, $K_2$ and $K_3$ are constants.

Thus, the adjustment of valve slidewire contact 35a and of valve 20 will be by an amount dependent upon the magnitude of each of the right-hand terms of the foregoing equation.

The importance of the adjustments of the system which have heretofore been described will be better appreciated by a resumé of the manner in which each of the components contributes to the positioning of the compensating means or valve 20. If it be assumed that the temperature of the compartment 10 is varying like a sine wave and that at a time $t=0$ the temperature is at the control point and thereafter gradually rises, the contact 35a and the valve 20 will be moved in a valve-closing direction. The adjustment is 180° out of phase with the temperature change, that is to say, the component due to proportional action, $K_1\theta$, will be maximum when the temperature has deviated a maximum amount from the control point and in a direction to oppose the change in temperature and will again be zero when the temperature is again at the control point.

The component due to reset action, namely $K_2\int\theta dt$, will be maximum at time $t=0$, inasmuch as the reset action is in accord with the cosine of $\theta$. Thus, the reset action, lagging proportional action by 90°, produces an additional movement of the slidewire contact 35a. The position-component due to reset action with the temperature at the control point after a rise of temperature is maximum. Hence, at that time the valve will be opened wider than without reset action. With the temperature at the control point after a decrease in temperature, contact 35a and valve 20 will be moved further toward closed position than they would be in the absence of reset action. Reset action overcomes droop, but it also aggravates the cyclic action of a varying temperature.

The rate action, of course, is the derivative of sine $\theta$, which is negative cosine $\theta$. Hence, rate action is a maximum when the rate of change of the temperature is maximum, which occurs as the temperature passes through the control point. The action is in a direction to increase the movement of contact 35a, that is, so that the valve 20 is opened more than it would be without rate action. More particularly, rate action acts in exactly the opposite way as reset action, but rate action is advanced 90° with respect to the proportional action.

In summary, reset action depends upon the past history of variation of the temperature, and the adjustment is in accord with the time integral of the departure from the control point of the temperature. If the valve is moving toward closed position due to proportional action resulting from a rising temperature below the control point, the reset action will be in a direction for opening movement of the valve. However, upon arrival at the control point the unbalance voltage as between $E_1$ and $E_3$, Fig. 1, reverses. With further rise in temperature, the proportional action continues to close the valve, but the sign of the reset action changes above the control point. It then acts in the same direction as the proportional action, tending to close the valve to a greater extent, so long as the temperature continues to rise. When the temperature begins to decrease, the proportional action begins to open the valve while the reset action continues to close the valve so long as the temperature is above the control point. The combined actions may result in instability, but with rate action acting oppositely to the reset action and with proper magnitude of the respective components, the control action as a whole is stabilized.

Referring again to Fig. 1, it will be remembered that the control point can be adjusted by varying contact 42a of slidewire 42.

If it is desired to utilize the system for program control that is, for change in the temperature of compartment 10 in accordance with a predetermined schedule, the contact 42a may be moved relative to slidewire 42 in accordance with that schedule and the temperature of compartment 10 will follow accordingly. Another way of predetermining the control point is mechanically to shift slidewire 31 relative to contact 31a, the mechanical shift or adjustment thereof being thereafter fixed with respect to the drive connection 32. This scheme is preferred in practice.

In order that the system shall function with full correction of droop it is necessary that the capacitor 54 be of high quality. By high quality is meant a capacitor having leakage much less than normally encountered with high-grade mica or oil-filled paper capacitors. If there is leakage at capacitor 54, it will be at once understood that when the potential of control slidewire 31 balances the potential of valve slidewire 35 there will be flow of current through reset resistors 52 and 53 and through the valve slidewire 35 and the capacitor 54, thus producing a voltage or potential drop $E_2$ which is not effective to change the charge of capacitor 54. Thus, the potential $E_2$ at a time when it should be zero is not zero. This is disadvantageous since a value of $E_1$ other than zero is required to balance $E_2$. In order to avoid the foregoing difficulties encountered with the highest grade capacitors obtainable at the time of the present invention, it was found necessary to utilize a capacitor of special design for reset capacitor 54. A capacitor constructed of polystyrene film in place of paper and embodying the usual foil has been found highly suitable for the present invention. Such a capacitor exhibits unusually high resistance, of the order of 1,000,000 megohms per microfarad, an increase of approximately one hundred times that of the higher grade capacitors heretofore available. Thus, the leakage at capacitor 54 has been reduced to a wholly negligible value.

The foregoing aspects of condenser construction are particularly important where the time constant of the circuit, including capacitor 54 and reset resistors 52 and 53 is high. For example, it is sometimes required that the capacitor 54 of 10 microfarads be connected in a branch of the circuit including the aforesaid resistors adjusted to values of the order of 100 megohms, the circuit then having a time constant of the order of 1000 seconds. Of course, the corresponding time constant may likewise be provided with capacitor 54 of 1 microfarad and a reset resistance of 1000 megohms. In that case, however, the ratio of the leakage resistance of the 1 microfarad capacitor will be the same for the 1000-megohm reset resistor as in the previous case.

The branch of the network including capacitor 62 may also be utilized to provide inverse rate action by closure of a switch 68 connected in shunt with resistor 58 and capacitor 59 which effectively removes them from the circuit. The resistor 58 is no longer effective to introduce rate action. The inverse rate action is provided by reason of a magnified voltage which appears at $E_3$. More particularly, if there is a change in the position of slidewire contact 31a with a corresponding change of adjustment of contact 35a, the flow of current will again be through a path including resistors 60 and 61 in preference to the high resistance path including resistors 52 and 53, the low resistance path including capacitors 54 and 62 and resistors 60 and 61. The magnification resulting is opposite in direction to the rate action which has previously been described and, hence, is called inverse rate action. With inverse rate action present, there will also be a component due to proportional action. The magnitude of the inverse rate action will be dependent upon the ratio of the size of the capacitor 62 with respect to the sum of the capacitances of capacitors 54 and 62. The inverse rate action may be varied by adjustment of resistor 60.

If inverse rate action is desired in the absence of an immediate effect of a component due to the proportional action, the switch 68 may be opened, a switch 125 closed, a switch 69 adjacent slidewire 31 opened, and a switch 70 closed to connect a capacitor 71 across conductors 30 and 46. The presence of capacitor 71 has the effect of delaying the appearance of the voltage $E_1$ between conductors 30 and 46 following a change in position of slidewire contact 31a.

If it is now assumed that slidewire 31 is moved a substantial amount, without delay, corresponding to a step function, with instantaneous change of the measuring voltage, the impedance of the capacitor 71 across conductors 30 and 46 will appear to be zero. A charge accumulates with gradually increasing potential on capacitor 71 as a function of time. The magnitude of the inverse rate action is under the control of a variable resistor 72 which upon opening of the switch 69 is introduced into circuit with capacitor 71.

If the slidewire contact 31a is moved at a given rate, the circuit including the resistor 72 and the capacitor 71 will introduce the inverse rate action of a magnitude corresponding with rate of change of position of slidewire contact 31a.

Now that the control network as a whole has been explained, it is to be understood that the mechanical relay 13 and its galvanometer 12 may be of any suitable type such as that shown in Squibb Patent No. 1,935,732 or the type shown in Williams Patent No. 2,113,164. Similarly, the amplifier 27 may be of any suitable null-type, though it is essential that it be of the high-impedance null-type for slow rates of reset.

The output circuit of the amplifier may, as shown in Fig. 6, be arranged to control a relay movable from one to another selected position, or it may be arranged as in Fig. 1 selectively to energize the operating coils of relays 25 and 26. Schematically to illustrate the latter arrangement, there is shown a transformer 75 having a primary winding connected across a suitable alternating-current source of supply 76 with a tapped secondary winding 77, the midpoint of which is connected to the amplifier 27 and the outer extremities of which are connected to the coils of relays 25 and 26. When the polarity of the input signal across conductors 29a and 30 is in one direction, one of the relays will be energized, such for example as the relay 25, to connect the motor from supply line L-1 through a circuit which extends by way of conductor 78, contact 79 of relay 25, conductor 80, contacts 81a of a "read-valve" switch 81, contacts 82a of limit switch 82, winding 23 of motor 22, and to the other supply line L-2. The arangement is such that the polarity of the input signal produces energization of the motor 22 to adjust slidewire contact 35a, as has already been described, to produce the voltage $E_3$ equal and opposite to $E_1$.

When the input signal between conductors 29a and 30 reverses in polarity the other relay 26 is energized to connect the other motor winding 24 from supply line L-1 by way of conductor 78, contact 83 of relay 25, contact 84 of relay 26, conductor 85, contacts 81b of switch 81, contacts 86a of limit switch 86, winding 24 and to the other supply line L-2 for reverse operation of the motor 22.

Associated with the relays 25 and 26 are signal lights 87 and 88 which as indicated are normally energized. The signal light 87 is energized through a circuit which may be traced from the line L-1 by way of signal light 87, conductors 89 and 80, contacts 81a and 82a, motor winding 23, and to the other line L-2. The circuit traced is of lower resistance than through resistor 90.

The other signal light 88 is normally energized by way of a circuit which may be traced from line L-1 by way of light 88, conductors 100 and 85, contacts 81b and 86a, motor winding 24 and to the other supply line L-2. The circuit traced is of lower resistance than by way of resistor 92.

Both lights are normally energized to indicate that the control system is functioning within its throttling range, that is with the valve 20 short of its maximum open position and short of its fully closed position. When the valve 20 is moved to one limit or the other, whether that be a fully closed or a fully open position, a cam 93 opens the contacts 86a at one limit, while a cam 94 opens the contacts 82a at the other limit. Thus, one or the other of signal lights 87 or 88 will be deenergized or the light-intensity greatly reduced to indicate that the system is not functioning within the throttling range, this indication being certain with the motor 22 at stand-still.

When relay 26 is energized it not only closes to energize motor winding 24, but it also completes a short circuit around signal light 88, extinguishing it. Thus, there is visual indication of energization of the motor for rotation in one direction. Similarly, the closure of the motor circuit by relay 25 extinguishes the signal light 87 for similar visual indicating purposes. If the system should be in oscillation, that is, the motor energized for rotation first in one direction and then in the other, the relays 25 and 26 will be rapidly operated between open and closed positions and the lights 87 and 88 will blink. The alternate flashing of these lights indicates presence of oscillation in the system which ordinarily can be suppressed by reducing the gain of the amplifier by a suitable gain control provided therefor. Blinking of but one light indicates normal control of the operation of motor 22.

In accordance with a further aspect of the invention, the system lends itself for determination of the position of the valve 20 at any time, though it may be remotely located from the control system proper. The individual switches with labels "RV" now to be described are preferably ganged so that upon movement of the "read-valve" switch 81 to open the motor circuit through the contacts 81a and 81b there is simultaneously operated a transfer switch 110 to transfer the input conductor 29a from the network to conductor 111 leading to the movable contact 112 of a slidewire 113 connected between conductors 114 and 115. At the same time a transfer switch 116 is moved to complete a circuit through switch arm 117 and conductor 118 conductively to by-pass or short-circuit the output from the slidewire 31.

Accordingly, with the "read-valve" switch 81 in its operated position, the amplifier 27 will respond to the difference in the voltage between contact 35a of slidewire 35 and the conductor 114 and the voltage appearing between the contact 112 and the conductor 114. If the voltage or potential between contact 35a and contact 112 is not zero, the amplifier will energize one or the other of relays 25 and 26. One of the signal lights 87 or 88 will be extinguished to indicate which relay has been energized. The signal lights 87 and 88 have their energizing circuits completed through resistors 90 and 92 respectively upon opening of "read-valve" switch contacts 81a and 81b. The contact 112 will also be adjusted until the input to the amplifier is zero the completion of this adjustment being indicated by the lighting of both signal lights 87 and 88. By means of a scale 113a associated with the slidewire 113, the position of the contact 35a relative to slidewire 35 can be read on the scale 113a, thus giving an indication of the position of the valve-actuating mechanism and of the valve 20.

In control systems of the type which have been described thus far, it is at times desirable manually to control the operation of the valve 20, particularly during the starting up of the process or during certain periods of operation where a change is desired which may be only temporary in nature, or in the event of the occurrence of abnormal conditions which can be best compensated for by manually controlled operations. However, with an electrical system of the type described, where charges are maintained on capacitors, it is important to maintain the system in condition for automatic operation even though there has been transfer to manual control. Otherwise the transfer from manual to automatic would disturb the process and cause considerable oscillation or hunting before the process under control stabilizes to maintain the variable characteristic at the control point.

It is a further object of the invention to provide for transfer from automatic to manual and from manual to automatic operation without disturbing the functioning of the system, particularly if operating to maintain the characteristic at its control point.

In going from automatic to manual operation, it is only necessary to operate the manual-automatic switch, comprising a plurality of switches preferably ganged for simultaneous operation. The manual switch 117 is moved to the right to complete a short-circuit connection between conductors 30 and 46 to remove any potential which may appear because of the position of contact 31a relative to slidewire 31. At the same time a switch 125 is moved to closed position to by-pass resistors 58 and 60, a switch 126 is moved to the closed position to connect the contact 112 of slidewire 113 through resistor 126a to conductors 29 and 29a leading to the input of amplifier 27. The latter switch 126 applies to the input circuit of the amplifier 27 any difference in voltage appearing between contacts 112 and 35a of their respective slidewires. By adjusting contact 112 relative to slidewire 113 a voltage will be applied to the amplifier which will energize one or the other of the relays 25 or 26 for operation of the motor to move the valve 20 and the slidewire 35 to balance the voltage introduced by the adjustment of contact 112. In this manner the valve 20 can be moved to any position desired and as indicated on scale 113a.

It will be understood that the adjustment of valve 20 will affect the temperature of the compartment or the chamber 10 and that the thermocouple 11 will cause operation of the mechanical relay 13 correspondingly to adjust the pointer 16 relative to scale 17.

If the operation of the valve 20 is such as to bring the temperature of the compartment 10 to the control point, that fact will be known by reading the scale 17. At that time the position of the slidewire contact 31a will also be at the control point. Meanwhile, the position of the slidewire contact 35a will correspond with the position of the valve 20 which brought the temperature to the control point. The potential derived from slidewire contact 112 is at all times applied to capacitor 54. Hence, the latter will have a potential corresponding with it, and also corresponding with that of 35a. Accordingly, if the manually operable switches are returned to the automatic or "A" positions, the voltage at $E_1$, being zero at the control point, will then be equal to the voltage $E_3$ which also will be zero, and there will not be further operation of motor 22 except by change in the temperature of the compartment 10 from the control point. In this manner there is avoided a proportional step which might otherwise have occurred had the charge on the capacitor 54 not been adjusted during the manual operation to equal that of contact 35a.

Further in accordance with the invention, it is desirable not to switch from manual to automatic without first operating the read-valve switch to its "read-valve" position. Read-valve switch 116 is then operated from the illustrated right-hand position to its left-hand position. If this is first done, it will be observed that the short-circuit from the network including slidewire 31 will be removed to inject into the network the voltage $E_1$. If that voltage is other than zero, it will appear at the amplifier 27.

Further in accordance with the invention, it may sometimes be desirable to transfer from manual to automatic without awaiting the return of the variable characteristic to the control point. That can be readily done without introducing a proportional-step-corrective-action in the operation of the system by operating the read-valve switch to "read-valve" position before operation of the manual switch to its automatic position. The motor will be deenergized as before and the short-circuit across conductors 30 and 46 will be removed to inject into network the voltage $E_1$. If that voltage is not zero as it will not be with the temperature away from the control point, that fact will be indicated by the deenergization of one or the other of signal lights 87 or 88. When that indication is received, the contact 112 will then be adjusted until compensation is had for the voltage $E_1$. As contact 112 is adjusted it varies the potential applied to the capacitor 54 and thus changes its charge by an amount corresponding to the voltage $E_1$ introduced because of the departure of the condition from its control point. Thus, as soon as signal lights 87 and 88 are both lighted, transfer may be made from manual to automatic and back from the "read-valve" position without introducing an undesired proportional step into the operation of the system.

Fig. 5 is a simplified wiring diagram of a further modification of the invention with the control-point setters omitted. The potentiometer circuit CS includes the control slidewire 31 while the potentiometer network VS includes the valve slidewire 35. As already explained in connection with Figs. 1 and 4, the capacitor 54 and the resistor 52 provide reset action, the resistor and capacitor together forming a single stage of integration of the departure of the characteristic $\theta$ from the control point. Similarly, the resistor 58 and capacitor 62 provide a single stage of rate action. It is to be understood that following each stage of either integration, or differentiation, there may be added further stages either for higher derivative control or for higher integral control, or both. More particularly, in Fig. 5 there is disclosed a capacitor 54a and a resistor 52a forming a second integrating stage followed by a resistor 58a and a capacitor 62a forming a second differentiating stage. The resistors 58a and 60a may be ganged for simultaneous adjustment as has been previously described in connection with resistors 58 and 60. Two or more stages of rate action provide the higher derivative control, since the second stage will provide the second derivative, and so on. Similarly, two or more integrating stages will provide the higher integral control. With the foregoing in mind it will, of course, be readily understood how any number of stages can be provided either of integral control or of derivative control and in any desired combination.

In the foregoing discussion, it is to be noted that the differentiating and integrating circuits are located between the amplifier having the high impedance and the valve slidewire 35. It will be recalled that the equation including the integral term and the derivative term, equated the change in valve position in terms of the nature and extent of the deviation from the characteristic from the control point. However, in Figs. 1, 4 and 5 the differentiating and integrating circuits function with reference to the change of voltage produced as the result of adjustment of the valve slidewire 35. Thus, a differentiating circuit such as the resistor 52 and the capacitor 54, where the voltage is applied from resistor 52 to the next stage, produces an integral action with respect to the deviation of the variable characteristic from the control point.

Again referring to Fig. 1, it is to be observed that if the control slidewire 31 is moved a predetermined amount as a result of a low temperature, the valve 20 will be eventually moved to wide-open position as a result of the combined control actions. If such a low-temperature condition should prevail for a sufficiently long time, the capacitor 54 will acquire a charge equal to the voltage between the contact of slidewire 35 and the juncture of resistors 50 and 51. Hence, there will be no current flow to develop a voltage or potential drop across resistors 52 and 53 to oppose voltage $E_1$. If the temperature should thereafter increase, the valve 20 would not be moved towards closed position until after the temperature of the compartment 10 again attained the control point and the polarity of the voltage $E_1$ reversed. Such charging of the capacitor 54 to its maximum value corresponds with a shift of the throttling range to such an extent that the lower limit of the throttling range is coincident with the control point. Obviously, such a control system when applied to batch processes would cause undesirable over-shooting of the control point. What may be referred to as a rate-of-approach setter is provided to overcome the foregoing difficulty.

In accordance with the modification of Fig. 6, a rate-of-approach relay 135 operates upon a predetermined departure of the characteristic under control below the control point fully to open the valve 20 and to limit the charge that can build up on reset capacitor 54. This arrangement limits the amount that the throttling range can be shifted.

The operation of the relay 135 is under the control of a device operable by extent of control-slidewire movement, as by a traveling nut 136 movable lengthwise of a threaded rod 137 rotated by the mechanical relay 13 or other condition-responsive device. When the temperature has decreased a predetermined amount the nut 136 will first engage a cam 138 to close contacts 139. Thereafter, the nut 136 engages a cam 140 to close contact 141. When the latter is closed there is an energizing circuit completed for the operating coil 142 of relay 135 which may be traced from supply line L-1 by way of conductor 143, contact 141, and by way of relay coil 142 to the other supply line L-2. The relay 135 is then energized to close its contacts 135a, 135b, to open its contact 135c and to operate the contacts 135d to energize the motor winding 24 for operation of the motor in a direction to open the valve. The motor is deenergized by a limit switch not shown in Fig. 6, but which has been illustrated and identified as 86a in Fig. 1. The contacts 135a complete a holding circuit for the relay 135 by way of contacts 139. The holding circuit is effective to keep the relay energized during rise of the temperature from its predetermined low value and over any selected range thereof. Thus, the length of cam 140 with reference to the longitudinal axis of the screw 137 is less than that of cam 138. In practice there are provisions for adjustment of the slidewire position at which contacts 141 close and at which contacts 139 open.

When the contacts 135b close, a predetermined potential is applied to the capacitor 54 under the control of the setting of the contact of a rate-of-approach slidewire 144 as by an adjusting knob 145. Thus, the potential of the capacitor 54 may be predetermined and selected as may be desired and in manner which will prevent overshoot of the variable to be controlled depending upon the particular requirements of the process to which the system is applied. As relay 135 is energized, contacts 135e and 135f are closed, a crank arm 146 being shown in Fig. 6 diagrammatically operating the contact through a connection 147. Contact 135e short-circuits the resistor 58 and capacitor 59, while the contact 135f short-circuits the input to the amplifier 27. Notwithstanding the amplifier will not have an output current for operation of a relay 148 through energization of its operating coil 149, the movement of the valve 20 to its fully-open position will cause the temperature to rise, and the mechanical relay 13 in response thereto will adjust the slidewire 31 and simultaneously move the nut 136 in a direction away from the cams 138 and 140. After the temperature has risen a predetermined amount the contacts 139 will open and the relay 135 will be deenergized. Each of the several switches operated thereby are returned to the positions illustrated in the drawing. The control system then takes over control of the motor 22. The reset capacitor 54 then has its predetermined charge as determined by the setting of the contact relative to the slidewire 144. Hence, the system has been made effective to initiate a closing movement of the valve 20, notwithstanding the fact that the temperature may not have arrived at the control point. This avoids overshooting the control point.

In Fig. 6, the relay 148 replaces the relays 25 and 26 of Fig. 1 in manner well understood by those skilled in the art. Relay 148 is normally biased to a mid-position, and when the amplifier output rises a predetermined amount an energizing circuit for motor winding 23 is completed, and when the energization of coil 149 decreases a predetermined amount the other motor winding 24 is energized. In other words, when there is a zero input signal to the amplifier 27 the contact 148a of relay 148 occupies a mid-position between its stationary contacts.

In the arrangement of Fig. 6, the operation of the system to predetermine the charge on the capacitor 54 during a period in which the valve 20 is in open position over a long period of time depends upon the movement of the control slidewire 31 to a lower limit, that is, a limit which corresponds with a predetermined low temperature in the compartment 10. In a system of the type shown in Fig. 6 the valve 20 may be moved to fully-open position without corresponding movement of the control slidewire 31 by an amount which would produce operation of the relay 135. More particularly, if there should occur a persistent deviation of the condition under control from the control point and that deviation should be maintained over a long period of time, the valve 20 will be moved and kept in fully-open position though the deviation from the control point and, hence, the movement of slidewire 31 may be but a slight amount.

The disadvantages mentioned above in connection with Fig. 6 have been overcome in the arrangement of Fig. 7 where the charge on the reset capacitor 54 does not depend upon the departure of the condition from the desired control point by a predetermined amount, but, on the contrary, does depend upon the length of time the valve 20 has been moved to one limiting-position or the other. More particularly, if it is assumed that the motor winding 24 energizes the motor 22 to open the valve 20, it will be observed that after operation of the valve to its fully-open position, the motor 22 will be deenergized due to the operation of limit switch 86, shown in Figs. 1 and 7. In accordance with the present embodiment of the invention, the motor circuit is not only opened, but also there is completed an energizing circuit through the contacts 86a, 86b for an operating coil 150 of a timing relay. If the valve 20 remains in the open position beyond the time interval set for the closing of relay 150, the relay will be energized to close a circuit for the operating coil 151 of a relay 152 to close its contacts 152a to apply to capacitor 54 a voltage determined by the setting of contact 144a relative to the slidewire 144 in manner described in connection with Fig. 6. Preferably a resistor 153 is included in the charging circuit for capacitor 54 to predetermine the rate of charging of capacitor 54. At the same time that contacts 152b are opened and contacts 152a close, the relay 152 operates through crank arm 154 to transfer the connections under the control of switch elements 152c and 152d. The contact 152d completes a discharge circuit for capacitor 62 which may be traced through resistor 61 and slidewire 60 and a resistor 155 which has been included to control the rate of discharge.

Instead of short-circuiting the input of the amplifier as in the case of Fig 6, there is provided in Fig 7 a voltage divider including the resistors 156 and 157 for attenuating the voltage appearing between the contact of valve slidewire 35 and the contact of the rate-of-approach slidewire 144.

The timing relay 150 also completes an energizing circuit for the operating coil 158 of a relay which is immediately energized to complete a short-circuit connection with respect to resistor 58.

With the system connected as described, it will be seen that there is continued application to the input circuit of the amplifier, signals due to any difference in voltage appearing as a result of the positioning of the contact 31a relative to control slidewire 31 and the position of the contact 35a relative to valve slidewire 35. The inclusion of the rate-of-approach slidewire 144 introduces a voltage which means that it is the voltage difference between contacts of slidewire 144 and contact of valve slidewire 35 divided by the voltage dividing network including resistors 156 and 157 which opposes the voltage developed by control slidewire 31. When the foregoing difference in voltage applies an input signal to the amplifier of opposite polarity, the relay 25 is energized to complete a circuit for the motor winding 23 for rotation of the valve 20 in a valve-closing direction. It is to be remembered that while the motor 22 is denergized by reason of the operation of the limit switch 86 to open its contacts 86a, the relay switch continues to be energized by reason of the output from the amplifier 27. However, as soon as the reversal occurs, the relay 26 is deenergized which thereupon deenergizes the timing relay 150 which deenergizes the operating coil 151 of relay 152, which thereupon moves to the position shown on the drawing. At the same time the timing relay 150 is deenergized, and after a short time interval it opens its contacts to deenergize the relay 158. The return of the relay 152 to the illustrated position returns the system to its normal position except for the rate action provided by capacitor 62 and resistor 58. Rate action is not immediately reestablished since the relay 158 continues to be energized to short-circuit the rate resistor 58. However, after the expiration of the time interval, long enough for voltage equalization to take place as between capacitor 54 and rate capacitor 62, relay 158 is deenergized to reestablish rate action. The system as a whole then automatically functions as has already been described.

The advantages of the system of Fig. 7 will be apparent since it operates in conformity with the time that the valve 20 is at one limit or the other. In the foregoing description the operation has been with reference to a fully-open position of valve 20 and this would normally be the case for a heating system. However, for a cooling system the position of the valve would normally be fully closed, and the modification to be made in the circuit will be obvious to those skilled in the art and need not be described in detail here.

In accordance with the modification of Fig. 8, there has been avoided entirely the use of the relays, timing devices, etc., described in connection with Fig. 7. For many applications the simplified system of Fig. 8 will be preferred, which is the same as Fig. 4 except for the addition of a rectifier 159 connected from the contact 160a of a slidewire 160, referred to as a rate-of-approach setter. It may be provided with an associated scale 160b for ease in predetermining the voltage between its contacts 160a and the conductor 161. During normal operation, the charge on capacitor 54 will determine the potential of conductor 161. So long as conductor 161 is positive with respect to contact 160a there will be no current flow through the rectifier 159 which should be of as high an impedance as possible, in the reverse direction of flow, counter to that indicated by the arrowhead. However, whenever the potential of conductor 161 as determined by capacitor 54 becomes negative with respect to contact 160a, current will flow in the low-impedance or forward direction of the rectifier 159 and, thus, will limit the charge of capacitor 54. That is to say, the charge on capacitor 54 will be limited so that conductor 161 can never become more negative than the setting of contact 160a. Thus, the system of self-regulating, is exceedingly simple and highly advantageous from the several aspects which have been mentioned. For proper operation, it is desirable that the impedance in the forward direction of the rectifier 159 be low as compared with the impedance or resistance through the path including resistors 52 and 53.

High impedance amplifiers of the type shown in Williams Patent No. 2,367,746 may be used for amplifier 27. While the slidewire contacts have been referred to as adjustable, it is to be understood that either the slidewire contact or the slidewire, or both, may be relatively adjustable and in the claims the reference to adjustment of a slidewire resistor is to be taken as generic to such relative adjustments. It is also to be understood that such slidewire adjustments are to be taken as the equivalent, and vice versa, of other circuit elements such as inductive adjustment of coils magnetically coupled to each other to introduce as by a rectified output a change in voltage in the network corresponding with that produced by slidewire 31 or 35. It is to be further understood that where in the claims reference has been made to a network having an adjustable circuit element such as the slidewire 35 or the slidewire 31, that the definition goes to the adjustability as between each slidewire and its associated contact and the loops or meshes when referred to as including such adjustable elements defines the adjustable portions thereof included in such loops or meshes. Relative movement between either of contacts 31a and 35a and its associated slidewire 31 and 35 does change the voltage from the respective slidewire contacts and the conductor to which each extremity of the slidewire is connected, as well as the voltage of any other suitable reference point, such as the reference point 44 of Fig. 1 for slidewire 35 and the reference point or contact 42a for the slidewire 31.

It is also to be understood that certain features of the invention may be used without other features thereof. For example, the system for manual control of valve 20 with the method and apparatus for applying a voltage or potential difference to reset capacitor 54 to prevent a proportional step not due to unbalance of the measuring system is useful in the absence of rate action in the system. Similarly either rate action or inverse rate action may be employed. The signalling system can be utilized in the absence of the "read-valve" provisions but it has added utility when used with them.

While preferred embodiments of the invention have been described, it is to be understood that further modifications may be made within the scope of the appended claims.

What is claimed is:

1. The combination set forth in claim 25 in which there is provided means for short-circuiting said rate resistor and said capacitor of small size for reversing the sign of the rate action produced by said rate capacitor and said rate-delay resistor to provide inverse rate action in the system.

2. A control system including a device for controlling the magnitude of a characteristic upon departure from a predetermined value including a valve slidewire, a reset capacitor, and a charging circuit between said valve slidewire and said reset capacitor including resistance of relatively high value, a charge-limiting circuit for said capacitor including a source of potential and a rectifier connected therein with a polarity such that its impedance is low in the forward direction as compared with the impedance of said charging circuit for flow of current to said capacitor in a charge-reducing direction whenever the charge exceeds a predetermined value, said rectifier having a high impedance to current flow in the reverse direction to limit flow of charging current to said capacitor by way of said charging circuit.

3. A control system including a device for controlling the magnitude of a condition upon departure from a predetermined control point, a balanceable network unbalanced upon departure of said condition from said control point, a condition varying means operable in a direction to return said condition to said control point upon deviation thereof, a reset capacitor, said network having a charging circuit for said capacitor for introducing a correction to overcome droop, means including a switch operable upon departure of said condition in one direction by a predetermined amount to connect said reset capacitor to a charge-limiting circuit to predetermine the charge upon said reset capacitor, and a second switching means effective during return of the condition towards its predetermined value for maintaining said connection to said charge-limiting circuit.

4. The combination set forth in claim 3 in which the system includes a differentiating circuit for introducing rate action into the operation thereof, and means operable under the control of said first-named switch for removing from said network the rate action during the time the charge on said capacitor is limited to said predetermined value and until operation of said second switching means.

5. A control system for positioning a condition-controlling device comprising a balanceable network adapted to be unbalanced upon deviation in the magnitude of a condition from a predetermined value, said network including a reset capacitor, a rate action capacitor, and a rate-of-approach setter, the combination of means operable upon operation of said condition-controlling device to a predetermined position for completing a charge-limiting circuit to said reset capacitor, means including a timing device operable after a time interval for rendering ineffective said rate action capacitor, said charge limiting circuit again becoming ineffective upon reversal of movement of said condition changing device immediately to render said reset capacitor effective, said means including said timing device being effective a time interval thereafter to again make said rate action capacitor effective.

6. The combination set forth in claim 5 in which there is included an amplifier having an input circuit, a voltage divider connected into said network under the control of said first-named means for applying to said input circuit of said amplifier a portion only of the voltage developed in said network for opposing the voltage developed by the control slidewire.

7. In an electrical system of controlling the position of a compensating means to maintain a variable characteristic at a predetermined value, the combination of an electrical network for producing a voltage which varies in accordance with position of said compensating means, driving means for said compensating means, a switch for disabling said driving means to maintain the said compensating means at standstill, an adjustable circuit element in said network, means operable with said switch for connecting said adjustable element to produce a second voltage opposing said first-named voltage, and a scale associated with said adjustable element for indicating position of said compensating means when said second voltage is equal to said first-named voltage.

8. The combination set forth in claim 7 in which said driving means is under the control of an amplifier having an output circuit including signalling means for normally indicating direction of rotation of said driving means, said signalling means remaining effective upon operation of said switch to disable said driving means for indicating when said second voltage is equal to said first-named voltage notwithstanding the disablement of said driving means.

9. In an electrical system of controlling the position of a compensating means to maintain a variable characteristic at a predetermined value and including driving means for said compensating means, a balanceable network for producing a first voltage varying with change in the magnitude of said characteristic, a second network for producing a second voltage which varies in accordance with the position of said compensating means, an amplifier having an input circuit responsive to differences between said first and said second voltages, the combination of means for remote indication of the position of said compensating means comprising a "read-valve" circuit controller for disabling said driving means, for short-circuiting said first voltage, and for transferring said second voltage to the input circuit of said amplifier by way of a separate circuit, an adjustable circuit element in said separate circuit for developing a voltage in opposition to said second voltage, signalling means connected to the output circuit of said amplifier, and a scale associated with said adjustable circuit element for indicating the position of said compensating means when said signalling means indicates zero output of said amplifier.

10. In a system for controlling the positioning of a quantity-controlling means to effect compensatory changes in a characteristic of a quantity in response to variations thereof, the combination comprising a balanceable network unbalanced by change in said quantity from a predetermined value, a rate resistor and a rate capacitor in different branches of said network for producing a compensating adjustment of said quantity-controlling means in accordance with the rate of change of said quantity, a rate-delay resistor in series in said branch including said rate capacitor for varying the time of attainment of the maximum correction due to rate action, means for simultaneously varying said rate resistor and said rate-delay resistor to change in the same direction the resistances thereof in their respective branches for increasing and decreasing the rate action with simultaneous increase and decrease of the rate-delay, and a capacitor of small capacitance connected in shunt with said rate resistor for preventing magnification by rate action of departures of said quantity from said predetermined value of duration less than the predetermined value.

11. In a system of controlling the position of a compensating means to maintain a variable characteristic at a predetermined value, the combination of a balanceable electrical control network having a first circuit-adjusting element for applying to said network a first voltage varying with the magnitude of said characteristic, a second circuit-adjusting element for applying to said network a second voltage which varies in accordance with the position of said compensating means, circuit components for developing in said network voltages which produce balance of said network when said variable characteristic has said predetermined value, a reset capacitor included in said network to modify the voltage balance thereof substantially to overcome droop, a high-impedance amplifier having an output circuit and an input circuit responsive to unbalance of said network, driving means for said compensating means under the control of said output circuit, signalling means operable under the control of said output circuit for indicating when said network is in balance, means for disabling said compensating means while said signalling means remain effective, and a voltage-varying circuit-element for varying said second voltage without changing the position of said second circuit-adjusting element to bring said network into balance thereby to predetermine the charge on said reset capacitor preparatory to return of adjustment of said second element to said driving means.

12. In a system of controlling the position of a compensating means to maintain a variable characteristic at a predetermined value, the combination of a balanceable electrical network, a first circuit-element for applying to said network a first voltage varying with the magnitude of said characteristic, a second circuit-element for applying to said network a second voltage which varies in accordance with the position of said compensating means to balance said network, a reset capacitor included in a circuit of said network to modify the voltage balance of said network to overcome droop, the voltage applied to said reset capacitor varying at least in part with adjustment of said compensating means, driving means for said compensating means, means for disabling said driving means to maintain said compensating means at standstill, and an adjustable third circuit-element for varying said second voltage to balance said network while said compensating means and said second circuit-element are in network-unbalancing positions to predetermine the charge of said reset capacitor prior to restoration of operation of said driving means.

13. The combination set forth in claim 12 in which said driving means is under the control of an amplifier having an input circuit response to unbalance of said network and an output circuit including signalling means for normally indicating the direction of rotation of said driving means, said signalling means remaining effective upon disablement of said driving means to indicate when said network is balanced whereby said driving means may be made effective with said network in balance and said characteristic at other than its predetermined value.

14. In a system of controlling the position of a compensating means to maintain a variable characteristic at a predetermined value, the combination of a balanceable electrical network, a first circuit-element for applying to said network a first voltage varying with the magnitude of said characteristic, a second circuit-element for applying to said network a second voltage which varies in accordance with the position of said compensating means to balance said network, a reset capacitor included in a circuit of said network to modify the voltage balance of said network to overcome droop, the voltage applied to said reset capacitor varying at least in part with adjustment of said compensating means, driving means operable in accord with unbalance of said network for operating said compensating means, a manually adjustable circuit-element for unbalancing said network for manual control of said driving means, means for disabling said driving means to maintain said compensating means at standstill, said manually adjustable means being operable to vary said second voltage to balance said network while said compensating means and said second circuit-element are at standstill and in network-unbalancing positions to predetermine the charge of said reset capacitor prior to restoration of operation of said driving means under the control of said network.

15. In a system of controlling the position of a compensating means to maintain a variable characteristic at a predetermined value, the combination of a balanceable electrical network, a first circuit-element for applying to said network a first voltage varying with the magnitude of said characteristic, a second circuit-element for applying to said network a second voltage which varies in accordance with the position of said compensating means to balance said network, a reset capacitor included in a circuit of said network to modify the voltage balance of said network to overcome droop, the voltage applied to said reset capacitor varying at least in part with adjustment of said compensating means, driving means operable in accord with unbalance of said network for operating said compensating means, a manually adjustable circuit-element for unbalancing said network for manual control of said driving means, switching means for removing from said network said first voltage during manual adjustment of said compensating means, means for disabling said driving means to maintain said compensating means at standstill and for operating said switching means to re-apply said first voltage to said network, said manually adjustable means being operable to vary said second voltage to balance said network while said compensating means and said second circuit-element are at standstill and in network-unbalancing positions to predetermine the charge of said reset capacitor prior to restoration of operation of said driving means under the control of said network.

16. In a system of controlling the position of a compensating means to maintain a variable characteristic at a predetermined value by change of the voltage balance of an electrical network, the method which comprises applying to said network a first voltage varying with the magnitude of said characteristic, applying to said network a second voltage which varies in accordance with the position of said compensating means to balance said network, capacitively varying the voltage balance of said network to overcome droop, removing application to said network of said first voltage, manually adjusting said compensating means to control said characteristic by unbalancing said network, with said compensating means at standstill again applying said first voltage to said network, and while said compensating means remains at standstill varying said second voltage to balance said network to predetermine the magnitude of said capacitance variation of said voltage unbalance prior to restoration of operation of said compensating means under control of the voltage balance of said network.

17. A system of controlling the setting of a compensating means to maintain a variable characteristic at a predetermined value, comprising a balanceable electrical network having a first adjustable circuit element for applying to said network a control voltage varying with the magnitude of said characteristic, a second adjustable circuit element for applying to said network an opposing voltage which varies in accordance with the setting of said compensating means, said network including first and second resistors and a capacitor in series in a loop-circuit including said second adjustable element, said second resistor and said capacitor being connected in an output branch of said loop-circuit with said first resistor between said branch and said second element to attenuate said opposing voltage, driving means for changing the setting of said compensating means, means including a high impedance amplifier having an output circuit for controlling the operation of said driving means and having an input circuit responsive to the voltage difference between said control voltage and the voltage appearing across said output branch of said loop-circuit, the attenuation of said opposing voltage by said first resistor introducing into the operation of said driving means a rate-control component varying in accordance with the rate of change of said variable characteristic, adjusting means for changing the value of said first resistor to adjust the magnitude of said rate-control component, and a driving connection between said adjusting means and said second resistor operable with change in the resistance value of said first resistor to change in the same direction the resistance value in said branch circuit of said second resistor.

18. A system of controlling the setting of a compensating means to maintain a variable characteristic at a predetermined value, comprising a balanceable electrical network having a first adjustable circuit element for applying to said network a control voltage varying with the magnitude of said characteristic, a second adjustable circuit element for applying to said network an opposing voltage which varies in accordance with the setting of said compensating means, said network including first and second resistors and a capacitor in series in a loop-circuit including said second adjustable element, said second resistor and said capacitor being connected in an output branch of said loop-circuit with said first resistor between said branch and said second element to attenuate said opposing voltage, driving means for changing the setting of said compensating means, means including a high impedance amplifier having an output circuit for controlling the operation of said driving means and having an input circuit responsive to the voltage difference between said control voltage and the voltage appearing across said output branch of said loop-circuit, the attenuation of said opposing voltage by said first resistor introducing into the operation of said driving means a rate-control component varying in accordance with the rate of change of said variable characteristic, adjusting means for changing the value of said first resistor to adjust the magnitude of said rate-control component, a driving connection between said adjusting means and said second resistor operable with change in the resistance value of said first resistor to change in the same direction the resistance value in said branch circuit of said second resistor and a second capacitor in shunt with said first resistor having a capacity which is small relative to that of said first capacitor for introducing into the operation of said driving means a negative rate action upon change of the rate of change of said characteristic.

19. A system of controlling the setting of a compensating means to maintain a variable characteristic at a predetermined value, comprising a balanceable electrical network having a first adjustable circuit element for applying to said network a control voltage varying with the magnitude of said characteristic, a second adjustable circuit element for applying to said network an opposing voltage which varies in accordance with the setting of said compensating means, said network including a reset capacitor and a reset resistor connected in a first loop-circuit including said second circuit element, said network including first and second resistors and a capacitor in series in a second loop-circuit including said reset resistor; said second resistor and said capacitor being connected in an output branch of said second loop-circuit, with said first resistor between said branch and said second element to attenuate said opposing voltage, driving means for changing the setting of said compensating means, means including a high impedance amplifier having an output circuit for controlling the operation of said driving means and having an input circuit responsive to the voltage differential between said control voltage and the voltage appearing across said output branch of said second loop-circuit, said reset capacitor and said reset resistor introducing into the operation of said driving means a control component representative of the summation of departure of said characteristic from said predetermined value and the attenuation of said opposing voltage by said first resistor introducing into the operation of said driving means a control component varying in accordance with the rate of change of said variable characteristic, adjusting means for changing the value of said first resistor to adjust the magnitude of said rate-control component, and a driving connection between said adjusting means and said second resistor operable with change in the resistance value of said first resistor to change in the same direction the resistance value in said branch circuit of said second resistor.

20. A system of controlling the setting of a compensating means to maintain a variable characteristic at a predetermined value, comprising a balanceable electrical network having a first adjustable circuit element for applying to said network a control voltage varying with the magnitude of said characteristic, a second adjustable circuit element for applying to said network an opposing voltage which varies in accordance with the setting of said compensating means, said network including a reset capacitor and a reset resistor connected in a first loop-circuit including said second circuit element, said network including first and second resistors and a capacitor in series in a second loop-circuit including said reset resistor, said second resistor and said capacitor being connected in an output branch of said second loop-circuit, with said first resistor between said branch and said second element to attenuate said opposing voltage, driving means for changing the setting of said compensating means, means including a high impedance amplifier having an output circuit for controlling the operation of said driving means and having an input circuit responsive to the voltage difference between said control voltage and the voltage appearing across said output branch of said second loop-circuit, said reset capacitor and said reset resistor introducing into the operation of said driving means a control component representative of the summation of departure of said characteristic from said predetermined value, and the attenuation of said opposing voltage by said first resistor introducing into the operation of said driving means a control component varying in accordance with the rate of change of said variable characteristic, adjusting means for changing the value of said first resistor to adjust the magnitude of the rate component, a driving connection between said adjusting means and said second resistor operable with change in the resistance value of said first resistor to change in the same direction the resistance value in said branch circuit of said second resistor, and a second capacitor in shunt with said first resistor having a capacity which is small relative to that of said first capacitor for introducing negative rate action into the operation of said driving means upon change of the rate of change of said characteristic.

21. A system of controlling the setting of a compensating means to maintain a variable characteristic of a quantity of a process at a predetermined value, the response time of said process after change in the setting of said compensating means being relatively long, comprising a balanceable electrical network having a first adjustable circuit element for applying to said network a control voltage varying with the magnitude of said characteristic, a second adjustable circuit element for applying to said network an opposing voltage which varies in accordance with the setting of said compensating means, said network including a reset capacitor and a reset resistor connected in a first loop-circuit including said second circuit element, said network including first and second resistors and a rate capacitor in series in a second loop-circuit including said second adjustable element, said second resistor and said rate capacitor being connected in an output branch of said second loop-circuit, with said first resistor between said branch and said second element to attenuate said opposing voltage, driving means for changing the setting of said compensating means, means including a high impedance amplifier having an output circuit for controlling the operation of said driving means and having an input circuit responsive to the voltage difference between said control voltage and the voltage appearing across said output branch of said second loop-circuit, said reset capacitor and said reset resistor introducing into the operation of said driving means a control component representative of the summation of departure of said characteristic from said predetermined value and the attenuation of said opposing voltage by said first resistor introducing into the operation of said driving means a control component varying in accordance with the rate of change of said variable characteristic, said first resistor and said rate capacitor having values providing a time constant adjustable from a value approaching zero as a limit to a value approaching the response time of the process, adjusting means for changing the value of said first resistor to adjust the magnitude of said rate-control component, a driving connection between said adjusting means and said second resistor operable with change in the resistance value of said first resistor to change in the same direction the resistance value in said branch circuit of said second resistor, and an additional resistor included in series in said output branch of said second loop-circuit for stabilizing operation of said driving means when said first and second resistors have been adjusted for inclusion of minimum resistance in their respective circuits, said additional resistor being of relatively small size.

22. In a system of controlling the setting of a compensating means to maintain a variable characteristic at a predetermined value, a balanceable electrical network comprising a first circuit element for applying to said network a control voltage varying with the magnitude of said characteristic, a second circuit element for applying to said network an opposing voltage which varies in accordance with the setting of said compensating means, driving means for changing said setting of said compensating means, means including a high impedance amplifier having an input circuit responsive to voltage unbalance of said network and an output circuit for controlling the energization of said driving means to maintain approximate balance of said network, said network including first and second resistors and a capacitor in circuit with said second element, said second resistor and said capacitor being connected in a branch extending across said second element, with said first resistor between said branch and said second element to attenuate said opposing voltage to introduce rate action into the operation of said driving means in accordance with the rate of change of said variable characteristic, adjusting means for changing the value of said first resistor to adjust the magnitude of said rate action, a driving connection between said adjusting means and said second resistor operable with change in the resistance value of said first resistor to change in the same direction the resistance value in said branch circuit of said second resistor, a second capacitor having a capacitance small in comparison with the capacitance of said first capacitor connected in shunt with said rate resistor for preventing introduction of said rate action into the control of said driving means by random transient changes of either said control voltage or of said opposing voltage.

23. A system for controlling the characteristic of a quantity of a process comprising a balanceable network, control means for producing in said network a first voltage whose magnitude is determined by the magnitude of said characteristic, follow-up means for producing in said network an opposing voltage, means for varying said opposing voltage upon change of said first voltage, a reset capacitor and a reset resistor of high impedance connected in series-circuit relation with said follow-up means, a rate resistor, a rate capacitor, and a rate-delay resistor connected in series-circuit relation with respect to said reset resistor, and a stabilizing capacitor connected in shunt with said rate resistor for counteracting rate action arising in response to transient changes of short duration of said control voltage, said stabilizing capacitor having a capacitance which is very small compared with each of the capacitances of said reset capacitor and of said rate capacitor.

24. The combination set forth in claim 23 in which there is provided a driving connection between said rate resistor and said rate-delay resistor for simultaneous adjustment of each of them to vary their respective resistances in the same direction in their respective circuits.

25. A system for controlling a characteristic of a quantity comprising means including a relatively adjustable contact and a control slidewire for producing a control voltage whose magnitude is determined by the magnitude of the characteristic, means including a relatively adjustable contact and a valve slidewire for producing an opposing voltage, a network in which said control voltage and said opposing voltage are opposed, an amplifier having an input circuit responsive to the difference between said voltages and having an output circuit, means connected to said output circuit and operable with change in output thereof for adjusting said valve slidewire in a direction to reduce the difference between said voltages, said network including a reset capacitor and a reset resistor in series-circuit relation with said contact of said valve slidewire, said network including a rate resistor, a rate capacitor and a rate-delay resistor in series-circuit relation with said reset resistor, and a capacitor of small size connected in shunt with said rate resistor and providing a low impedance path around said rate resistor for immediate development across said rate-delay resistor of changes in said opposing voltage.

26. A system for controlling a characteristic of a quantity comprising means including a relatively adjustable contact and a control slidewire for producing a control voltage whose magnitude is determined by the magnitude of the characteristic, means including a relatively adjustable contact and a valve slidewire for producing an opposing voltage, a network including said slidewires, an amplifier having an input circuit responsive to the difference between said voltages and an output circuit for varying said opposing voltage in a direction to decrease the difference voltage applied to said input circuit, said network including a reset capacitor and a reset resistor in series-circuit relation with said contact of said valve slidewire, a rate capacitor and a rate-delay resistor connected in series-circuit relation with each other and together forming a branch of the network directly in parallel with said reset resistor for introducing inverse rate action into the operation of the system, the voltage developed across said last-named branch directly opposing said control voltage.

27. A system of controlling the setting of a compensating means to maintain a variable characteristic at a predetermined value, comprising a balanceable electrical network having a first adjustable circuit element for applying to said network a control voltage varying with the magnitude of said characteristic, a second adjustable circuit element for applying to said network an opposing voltage which varies in accordance with the setting of said compensating means, said network including a reset capacitor and a reset resistor connected in an energizing circuit including said second circuit element, driving means for changing the setting of said compensating means, means including a high impedance amplifier having an output circuit for controlling the operation of said driving means and an input circuit responsive to voltage unbalance of said network, said reset capacitor and said reset resistor introducing into the operation of said driving means a control component representative of the summation of departure of said characteristic from said predetermined value, said network including means for limiting the charge on said reset capacitor acquired through its said energizing circuit, and circuit means operable in conjunction with said last-named means after prolonged departure of said characteristic from said predetermined magnitude for rendering said charge-limiting means effective to limit the charge which can thereafter be acquired by said reset capacitor.

28. A system of controlling the setting of a compensating means to maintain a variable characteristic at a predetermined value, comprising a balanceable electrical network having a first adjustable circuit element for applying to said network a control voltage varying with the magnitude of said characteristic, a second adjustable circuit element for applying to said network an opposing voltage which varies in accordance with the setting of said compensating means, said network including a reset capacitor and a reset resistor connected in an energizing circuit including said second circuit element, driving means for changing the setting of said compensating means, means including a high impedance amplifier having an output circuit for controlling operation of said driving means and an input circuit responsive to voltage unbalance of said network, said reset capacitor and said reset resistor introducing into the operation of said driving means a control component representative of the summation of departure of said characteristic from said predetermined value, said network including means for limiting the charge on said reset capacitor acquired through its said energizing circuit, circuit means operable in conjunction with said last-named means after prolonged departure of said characteristic from said predetermined magnitude for rendering said charge-limiting means effective to limit to a predetermined value the charge which can thereafter be acquired by said reset capacitor comprising a circuit including a rectifier and a source of potential predetermining the charge said capacitor can acquire, said rectifier providing a low impedance path in a forward direction for flow of current to prevent said capacitor from acquiring a charge above said predetermined value and having a high impedance to current flow in the reverse direction to minimize loss of charging current while said capacitor has a charge below said predetermined value.

29. A system of controlling the setting of a compensating means to maintain a variable characteristic at a predetermined value, comprising a balanceable network having a first adjustable circuit element for applying to said network a control voltage varying with the magnitude of said characteristic, a second adjustable circuit element for applying to said network an opposing voltage which varies in accordance with the setting of said compensating means, driving means for changing the setting of said compensating means and for adjusting said second adjustable circuit element, a high impedance amplifier having an output circuit for controlling the energization of said driving means and having an input formed by a loop circuit including a pair of conductors extending from each of said adjustable elements, a plurality of meshes interconnecting said two conductors, each mesh of which includes a capacitor in the loop circuit and a resistor extending between said conductors, and a plurality of meshes each of which includes a resistor in said loop circuit and a capacitor included in a circuit extending between said conductors, said meshes respectively modifying the voltage developed by at least one of said adjustable elements in accordance with first and higher derivatives and integrals of departure of said characteristic from said predetermined value.

30. A system of controlling the setting of a compensating means to maintain a variable characteristic at a predetermined value, comprising a balanceable network having a first adjustable circuit element for applying to said network a control voltage varying with the magnitude of said characteristic, a second adjustable circuit element for applying to said network an opposing voltage which varies in accordance with the setting of said compensating means, driving means for changing the setting of said compensating means and for adjusting said second adjustable circuit element, a high impedance amplifier having an output circuit for controlling the energization of said driving means and having an input formed by a loop circuit including a pair of conductors extending from each of said adjustable elements, a plurality of meshes interconnecting said pair of conductors extending from said second adjustable element, each mesh of which includes a capacitor in the loop circuit and a resistor extending between said conductors, and a plurality of meshes each of which includes a resistor in said loop circuit and a capacitor included in a circuit extending between said last-named pair of conductors, said meshes respectively modifying the voltage developed by at least one of said elements in accordance with first and higher derivatives and integrals of departure of said characteristic from said predetermined value.

31. A system of controlling the setting of a compensating means to maintain a variable characteristic at a predetermined value, comprising a balanceable network having a first adjustable circuit element for applying to said network a control voltage varying with the magnitude of said characteristic, a second adjustable circuit element for applying to said network an opposing voltage which varies in accordance with the setting of said compensating means, driving means for changing the setting of said compensating means and for adjusting said second adjustable circuit element, a high impedance amplifier having an output circuit for controlling the energization of said driving means and having an input formed by a loop circuit, said network including a pair of conductors extending from each of said adjustable elements, a plurality of meshes interconnected by said two conductors, each mesh of which includes a capacitor in the loop circuit and a resistor extending between said conductors, and a plurality of meshes each of which includes a resistor in said loop circuit and a capacitor included in a circuit extending between said conductors, certain of said first-named plurality of meshes being interposed between certain of said second-named plurality of meshes, said meshes respectively modifying the voltage developed by said second circuit element in accordance with first and higher derivatives and integrals of departure of said characteristic from said predetermined value.

ELWOOD T. DAVIS.

References Cited in the file of this patent

UNITED STATES PATENTS

| Number | Name | Date |
|---|---|---|
| 2,061,410 | Stablein | Nov. 17, 1936 |
| 2,282,726 | Jones | May 12, 1942 |
| 2,312,711 | Harrison | Mar. 2, 1943 |
| 2,316,240 | Harrison | Apr. 13, 1943 |
| 2,336,492 | MacKay | Dec. 14, 1943 |
| 2,376,599 | Jones | May 22, 1945 |
| 2,439,198 | Bedford | Apr. 6, 1948 |